US010716062B1

(12) United States Patent
Kato et al.

(10) Patent No.: US 10,716,062 B1
(45) Date of Patent: Jul. 14, 2020

(54) WIRELESS SYSTEM, POWER EFFICIENCY CONTROL METHOD, SERVER, AND BASE STATION

(71) Applicant: Panasonic Intellectual Property Management Co., Ltd., Osaka (JP)

(72) Inventors: Osamu Kato, Fukuoka (JP); Masahisa Okuda, Kanagawa (JP); Noriyuki Shimizu, Kanagawa (JP); Hiroaki Asano, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/579,200

(22) Filed: Sep. 23, 2019

(30) Foreign Application Priority Data

Jun. 18, 2019 (JP) .................................. 2019-112673

(51) Int. Cl.
*H04W 72/12* (2009.01)
*H04B 7/15* (2006.01)
(Continued)

(52) U.S. Cl.
CPC ... *H04W 52/0206* (2013.01); *H04W 28/0221* (2013.01); *H04W 40/10* (2013.01)

(58) Field of Classification Search
CPC . H04B 7/15592; H04B 7/2606; H04L 45/125; H04L 45/24; H04W 40/12;
(Continued)

(56) References Cited

U.S. PATENT DOCUMENTS

2008/0181167 A1* 7/2008 Sydir .................... H04W 74/00
370/315
2009/0219853 A1* 9/2009 Hart ....................... H04B 7/155
370/315
(Continued)

OTHER PUBLICATIONS

Ogawa et al., "Traffic Adaptive Formation of mmWave Meshed Backhaul Networks," *ICC2017: WS03—The 10th International Workshop on Evolutional Technologies & Ecosystems for 5G and Beyond (WDN-5G ICC2017)*, IEEE 2017, 7 pages.

*Primary Examiner* — Gary Lafontant
(74) *Attorney, Agent, or Firm* — Seed IP Law Group LLP

(57) ABSTRACT

A wireless system includes a plurality of base stations including a first base station connected to a backbone network and a plurality of second base stations connected to the first base station by wireless multi-hop, and a server disposed in the backbone network and communicating with the first base station. The server collects traffic conditions of one or more terminals accommodated in communication areas of the plurality of base stations for a predetermined period, determines a combination of the first base station and at least a part of the plurality of second base stations that satisfy the traffic conditions and a predetermined power consumption amount criterion as an active base station, and determines path information for connecting the active base station by the wireless multi-hop to notify the active base station of the path information and transmits a sleep instruction for setting a sleep state in which a power consumption amount is capable of being reduced to base stations other than the active base station.

22 Claims, 9 Drawing Sheets

(51) Int. Cl.
*H04W 52/02* (2009.01)
*H04W 28/02* (2009.01)
*H04W 40/10* (2009.01)

(58) Field of Classification Search
CPC ............... H04W 88/04; H04W 84/047; H04W 52/0206; H04W 28/0221; H04W 40/10
See application file for complete search history.

(56) References Cited

U.S. PATENT DOCUMENTS

2010/0177672 A1\* 7/2010 Dayal .................... H04W 52/46
370/311
2010/0227620 A1\* 9/2010 Naden .................. H04B 7/2606
455/445

\* cited by examiner

FIG. 5

| COMBINATION OF PW(i) | POWER ON AND OFF STATES OF BASE STATION (○ MARK : PW(i)=1) | | | | | | | | | | | | | | | | WIRELESS BACKHAUL LINE PATH PATTERN |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | |
| (1) | ○ | ○ | ○ | ○ | ○ | ○ | ○ | ○ | ○ | ○ | ○ | ○ | ○ | ○ | ○ | ○ | (1) − 1 |
| (2) | ○ | ○ | | | ○ | | | | ○ | | ○ | ○ | | ○ | | | (2) − 2 |
| (3) | ○ | ○ | | ○ | ○ | | | ○ | | ○ | | ○ | | | | ○ | (3) − 4 |

WIRELESS SYSTEM, POWER EFFICIENCY CONTROL METHOD, SERVER, AND BASE STATION

BACKGROUND

1. Technical Field

The present disclosure relates to a wireless system, a power efficiency control method, a server, and a base station.

2. Description of the Related Art

A demand for a high-quality video wireless transmission of, for example, an automatic drive system or a monitoring camera system is increasing, and there is an urgent need to increase a capacity of a wireless system. A small cell system that controls a base station of a high capacity wireless standard, such as 5G (5th generation mobile communication system) which is the latest standard of a cellular system or a wireless LAN (for example, IEEE802.11ax, IEEE802.11ad, IEEE802.11ay) whose speed is increasing at a high areal density is a candidate for solving the needs described above. However, in realizing the small cell system, a power consumption amount of a huge number of base stations becomes a problem.

For the above-described problem, for example, "Traffic Adaptive Formation of mmWave Meshed Backhaul Networks", Hiroaki Ogawa et al., ICC2017 WS03-The 10th International Workshop of Evolutional Technologies & Ecosystems for 5G and Beyond, 2017 proposes a method in which an LTE base station corresponding to a relatively large cell long term evolution (LTE) is combined with a millimeter wave band 5G base station corresponding to a relatively small cell millimeter wave band 5G, and only a minimum millimeter wave band 5G base station necessary to accommodate a traffic that cannot be accommodated in an LTE base station among traffic volumes generated by the entire wireless system is power on to be accommodated in the millimeter wave band 5G base station. In this method, a network of the millimeter wave band 5G base station is configured by a millimeter wave gateway having a wire backhaul and a millimeter wave small cell base station having a wireless backhaul to the millimeter wave gateway wirelessly without having the wire backhaul. In order to configure the wireless backhaul, a power supply of the millimeter wave small cell base station is turned on when the millimeter wave small cell base station runs short (in other words, when the number of millimeter wave small cell base stations with power off is excessive). According to the method, the number of millimeter-wave small cell base stations to be powered on can be suppressed to minimum needs in consideration of both an aspect of accommodating air interface traffic and an aspect of accommodating wireless backhaul traffic. Therefore, it is possible to reduce the entire power consumption amount of a wireless system while coping with an areal imbalance of traffic.

The above-described method of "Traffic Adaptive Formation of mmWave Meshed Backhaul Networks", Hiroaki Ogawa et al., ICC2017 WS03-The 10th International Workshop of Evolutional Technologies & Ecosystems for 5G and Beyond, 2017 is premised on the presence of a wireless method capable of covering a wide area such as LTE. Therefore, for example, a configuration of a method intended to reduce a power consumption amount in a wireless system configured only by a millimeter wave band 5G base station corresponding to the millimeter wave band 5G is not employed. The method of "Traffic Adaptive Formation of mmWave Meshed Backhaul Networks", Hiroaki Ogawa et al., ICC2017 WS03-The 10th International Workshop of Evolutional Technologies & Ecosystems for 5G and Beyond, 2017 is a method directed to achieve a reduction in the power consumption amount by turning off power of the millimeter wave small cell base station as much as possible. Accordingly, it is effective to reduce the power consumption amount under a condition that the entire traffic volume of the wireless system is relatively small. However, it is difficult to reduce a power consumption amount under a condition that the entire traffic volume of the wireless system is relatively large.

The method of "Traffic Adaptive Formation of mmWave Meshed Backhaul Networks", Hiroaki Ogawa et al., ICC2017 WS03-The 10th International Workshop of Evolutional Technologies & Ecosystems for 5G and Beyond, 2017 does not describe how to collect information on the total traffic amount of the wireless system and a surface distribution of the traffic. In the method of "Traffic Adaptive Formation of mmWave Meshed Backhaul Networks", Hiroaki Ogawa et al., ICC2017 WS03-The 10th International Workshop of Evolutional Technologies & Ecosystems for 5G and Beyond, 2017, the total traffic amount and the surface distribution of the traffic are known in simulation evaluation. The method of "Traffic Adaptive Formation of mmWave Meshed Backhaul Networks", Hiroaki Ogawa et al., ICC2017 WS03-The 10th International Workshop of Evolutional Technologies & Ecosystems for 5G and Beyond, 2017 is premised that all data transmitted and received between a terminal and each millimeter wave small cell base station is collected in a core network via an LTE base station or a millimeter wave gateway. Therefore, even when information is exchanged between terminals, the information is required to go through the core network, and even when the information is exchanged between terminals located in the vicinity, a delay time cannot be largely reduced.

SUMMARY

The present disclosure is made in view of circumstances of related art, and provides a wireless system, a power efficiency control method, a server, and a base station which achieve both securement of a system capacity required in a wireless communication and suppression to a minimum power consumption amount of the wireless system depending on a time change of a traffic volume.

The present disclosure provides a wireless system including a plurality of base stations including a first base station connected to a backbone network and a plurality of second base stations connected to the first base station by wireless multi-hop, and a server disposed in the backbone network and communicating with the first base station, in which the server collects traffic conditions of one or more terminals accommodated in communication areas of the plurality of base stations for a predetermined period, determines a combination of the first base station and at least a part of the plurality of second base stations that satisfy the traffic conditions and a predetermined power consumption amount criterion as an active base station, and determines path information for connecting the active base station by the wireless multi-hop to notify the active base station of the path information and transmits a sleep instruction for setting a sleep state in which a power consumption amount is capable of being reduced to base stations other than the active base station.

The present disclosure provides a power efficiency control method performed by a wireless system including a plurality of base stations including a first base station connected to a backbone network and a plurality of second base stations connected to the first base station by wireless multi-hop, and a server disposed in the backbone network and communicating with the first base station, and the power efficiency control method includes collecting traffic conditions of one or more terminals accommodated in communication areas of the plurality of base stations for a predetermined period, determining a combination of the first base station and at least a part of the plurality of second base stations that satisfy the traffic conditions and a predetermined power consumption amount criterion as an active base station, and determining path information for connecting the active base station by the wireless multi-hop to notify the active base station of the path information and transmitting a sleep instruction for setting a sleep state in which a power consumption amount is capable of being reduced to base stations other than the active base station.

The present disclosure provides a server disposed in a backbone network and including a communicator communicating with a first base station connected to the backbone network, a collector collecting traffic conditions of one or more terminals accommodated in a communication area of each of a plurality of base stations including the first base station and a plurality of second base stations connected to the first base station by wireless multi-hop in a predetermined period, and a determiner determining a combination of the first base station and at least a part of the plurality of second base stations that satisfy the traffic conditions and a predetermined power consumption amount criterion as an active base station, in which the determiner determines path information for connecting the active base station by the wireless multi-hop to notify the active base station of the path information and transmits a sleep instruction for setting a sleep state in which a power consumption amount is capable of being reduced to base stations other than the active base station via the communicator.

The present disclosure provides a base station connected to a first base station connected to a backbone network by wireless multi-hop and including a communicator collecting traffic conditions of one or more terminals accommodated in a communication area of a related station for a predetermined period and transmitting the traffic conditions to the first base station communicating with a server disposed in the backbone network, a controller controlling an active state or a sleep state of the related station based on a determination result of whether or not the base station is an active base station satisfying the traffic conditions and a predetermined power consumption amount criterion, and a path manager setting a path of the wireless multi-hop, based on path information of wireless multi-hop transmitted from the server via the first base station, when it is determined that a related station is the active base station based on the determination result.

According to the present disclosure, it is possible to achieve both securement of a system capacity required in a wireless communication and suppression to a minimum power consumption amount of the wireless system depending on a time change of a traffic volume.

BRIEF DESCRIPTION OF THE DRAWINGS

FIG. 5 is a diagram illustrating an example of a correspondence relationship between combinations of sub-base stations having different power on and off states and a wireless multi-hop path pattern;

DETAILED DESCRIPTION

Hereinafter, embodiments in which a wireless system, a power efficiency control method, a server, and a base station according to the present disclosure are specifically disclosed will be described in detail with reference to the drawings as appropriate. However, the detailed description more than necessary may be omitted. For example, detailed description of well-known matters and a redundant description on substantially the same configuration may be omitted. This is to avoid an unnecessary redundancy in the following description and to facilitate understanding by those skilled in the art. Accompanying drawings and the following description are provided to enable those skilled in the art to fully understand the present disclosure and are not intended to limit subject matters of claims.

Wireless system 100 according to first embodiment (see FIG. 1) is provided with many small cell 5G base stations (that is, base stations performing a wireless communication corresponding to 5G, with a small cell different from a wide large cell such as an existing LTE as a communication area) with a large area density. Thereby, it is possible to cope with a use case where traffic during a wireless communication in wireless system 100 becomes enormous in peak hour, and it is possible to construct and provide a high-capacity wireless system not depending on an existing cellular operator (for example, LTE communication common carrier and the like). In above-described use case, for example, a monitoring camera system installed in a smart town, automation of factory or a construction site or introduction of a robot, and safe driving support in a high traffic area or a car-to-car operation for automatic driving and a road-to-vehicle communication are considered, and the present disclosure may not be limited to these.

Configuration of Wireless System

Figure 1:
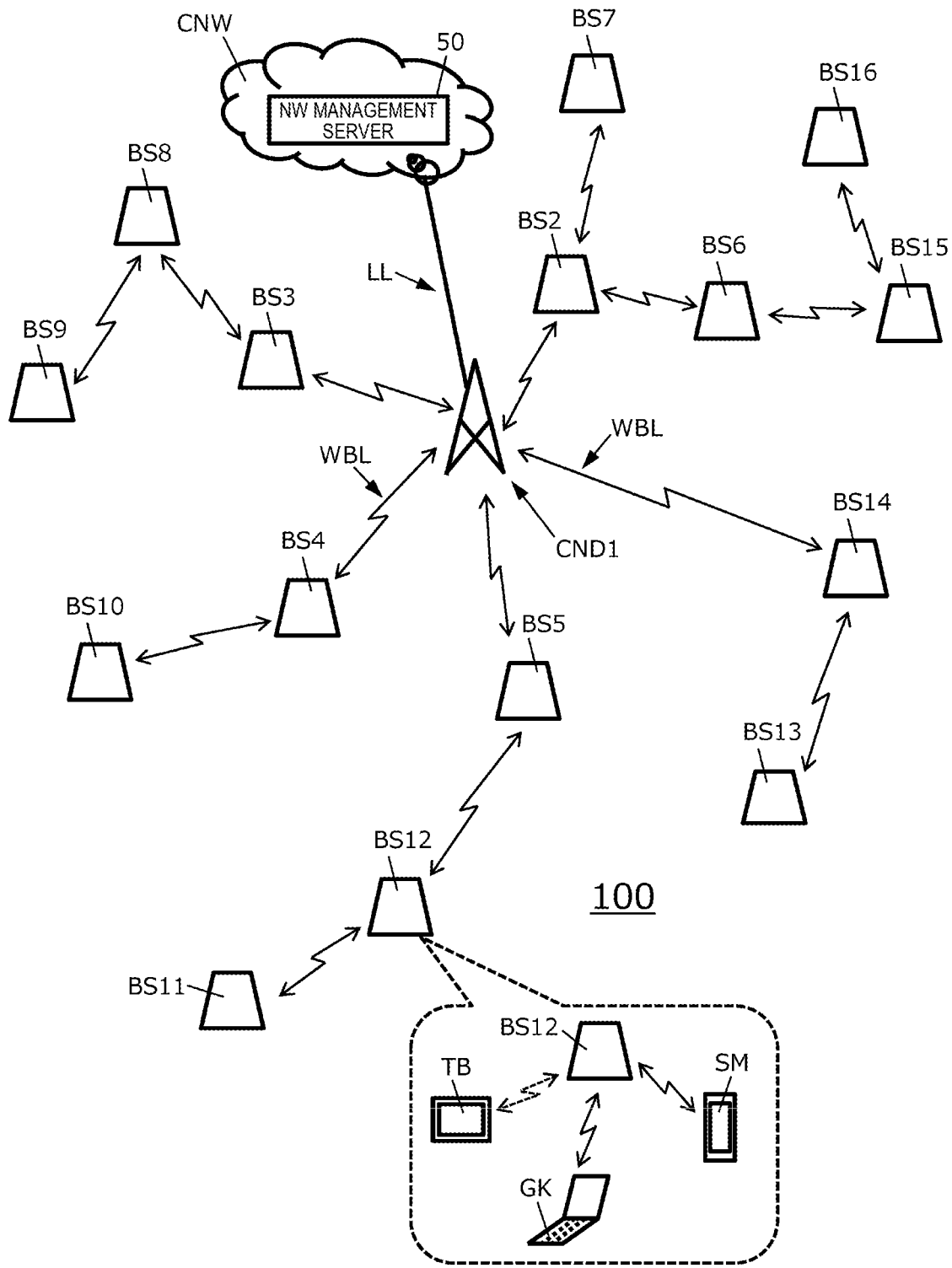
FIG. 1 schematically illustrates a system configuration example of a wireless system according to a first embodiment.

First, a configuration of wireless system 100 according to the first embodiment will be described with reference to FIG. 1. FIG. 1 is a diagram schematically illustrating a system configuration example of wireless system 100 according to the first embodiment. Wireless system 100 is configured to include backbone network CNW in which network management server 50 is disposed, and many base stations (specifically, one core base station CND1 and a plurality of sub-base stations BS2, BS3, BS4, BS5, BS6, BS7, BS8, BS9, BS10, BS11, BS12, BS13, BS14, BS15, and BS16). In FIG. 1, the network is abbreviated as "NW".

Figure 2:
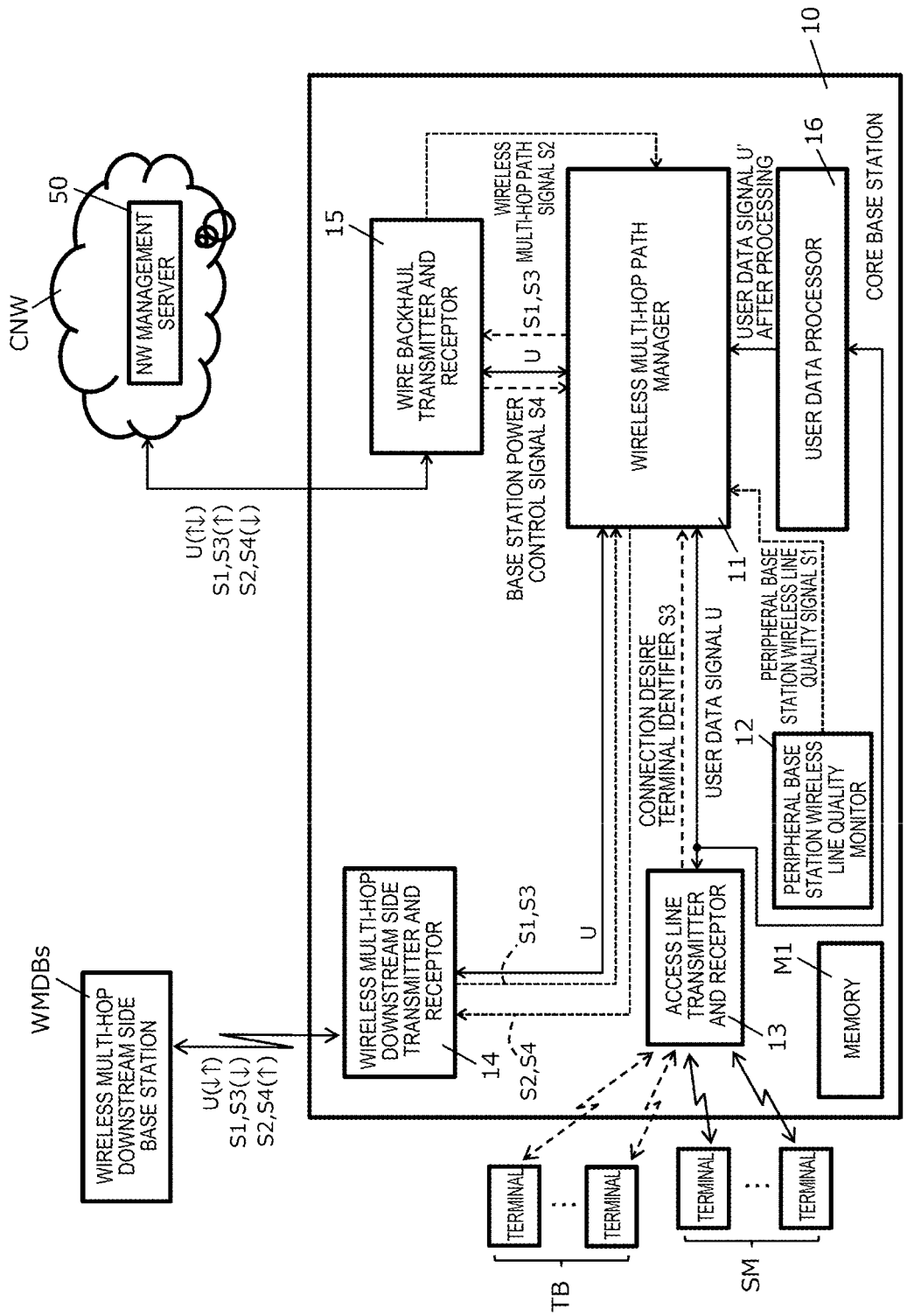
FIG. 2 is a block diagram illustrating a hardware configuration example of a core base station.

Network management server 50 as an example of a server is disposed in backbone network NW and can communicate with core base station CND1 (see FIG. 2). A wire communication via wire backhaul line LL such as an optical line using an optical fiber is possible between network management server 50 and core base station CND1. Details of a configuration of network management server 50 will be described below with reference to FIG. 4.

Core base station CND1 as an example of the first base station has a small cell corresponding to a frequency band to be handled as a communication area, and is a small cell 5G base station performing a wireless communication of 5G (5th generation mobile communication method) using a high frequency band (for example, a millimeter wave band) with at least one terminal accommodated in a communication area. Hereinafter, a communication line between the core base station or the sub-base station and a terminal to be accommodated is defined as an "air interface line". Core base station CND1 can be wirelessly connected to at least one sub-base station by wireless multi-hop, and specifically, can be wirelessly connected to the sub-base stations BS2, BS3, BS4, BS5, and BS14 by wireless backhaul line WBL. Core base station CND1 transmits various control signals or a user data signal (for example, high-quality video data captured by a monitoring camera) transmitted from a sub-base station of the wireless multi-hop on a downstream side to network management server 50 of the wireless multi-hop on an upstream side. Core base station CND1 can also transmit various control signals or a user data signal transmitted from a terminal accommodated in the core base station to network management server 50. Details of a configuration of core base station CND1 will be described below with reference to FIG. 2.

Each of sub-base stations BS2 to BS16 as an example of the second base station has a small cell (see above description) according to the frequency band to be handled as a communication area, and is a small cell 5G base station performing a wireless communication of 5G (a fifth generation mobile communication method) using a high frequency band (for example, a millimeter wave band) with at least one terminal to be accommodated in the communication area. Each of sub-base stations BS2 to BS16 can be wirelessly connected to at least one sub-base station or core base station CND1 by the wireless multi-hop, and transmits various control signals or the user data signal (see above description) transmitted from the sub-base station of the wireless multi-hop on the downstream side to the sub-base station or core base station CND1 of the wireless multi-hop on the upstream side. Each of sub-base stations BS2 to BS16 can also transmit various control signals or the user data signal transmitted from a terminal (for example, a cellular phone GK, a smartphone SM, or a tablet terminal TB) accommodated in the sub-base station to a sub-base station or core base station CND1 on an upstream side. Details of a configuration of each of sub-base stations BS2 to BS16 will be described below with reference to FIG. 3.

In FIG. 1, sub-base stations BS2 and BS7 are communicably connected to core base station CND1 by the wireless multi-hop (for example, an applicable wireless technology is cellular 5G or wireless LAN). In other words, a wireless multi-hop network is formed by sub-base stations BS2 and BS7 and core base station CND1, and a path configuration of the wireless multi-hop network is determined and managed by network management server 50. That is, it is conceivable to also apply a 5G standard to a wireless backhaul line used in a wireless communication of the wireless multi-hop in the same manner as an air interface line in the future.

Sub-base stations BS3, BS8, and BS9 are communicably connected to core base station CND1 by the wireless multi-hop (see the above description). In other words, a wireless multi-hop network is formed by sub-base stations BS3, BS8, and BS9 and core base station CND1, and a path configuration of the wireless multi-hop network is managed by network management server 50.

Sub-base stations BS2, BS6, BS15, and BS16 are communicably connected to core base station CND1 by wireless multi-hop (see above description). In other words, the wireless multi-hop network is formed by sub-base stations BS2, BS6, BS15, and BS16 and core base station CND1, and the path configuration of the wireless multi-hop network is managed by network management server 50.

Sub-base stations BS4 and BS10 are communicably connected to core base station CND1 by wireless multi-hop (see above description). In other words, the wireless multi-hop network is formed by sub-base stations BS4 and BS10 and core base station CND1, and a path configuration of the wireless multi-hop network is managed by network management server 50.

Sub-base stations BS5, BS12, and BS11 are communicably connected to core base station CND1 by wireless multi-hop (see above description). In other words, the wireless multi-hop network is formed by sub-base stations BS5, BS12, and BS11 and core base station CND1, and the path configuration of the wireless multi-hop network is managed by network management server 50.

Sub-base stations BS14 and BS13 are communicably connected to core base station CND1 by wireless multi-hop (see above description). In other words, the wireless multi-hop network is formed by sub-base stations BS14 and BS13 and core base station CND1, and a path configuration of the wireless multi-hop network is managed by network management server 50.

In FIG. 1, wireless system 100 is configured to include, for example, only one core base station CND1, but the wireless system may not be limited to one core base station. However, by reducing the number of installed core base stations CND1, it is possible to secure an installation place of core base station CND1 and to reduce burden of a wire wiring work, in view of characteristics that core base station CND1 is connected to backbone network NW by wire backhaul line LL. Sub-base stations BS2 to BS16 other than core base station CND1 may be dynamically connected by wireless backhaul line WBL based on a quality of the wireless line to peripheral base stations.

FIG. 2 is a block diagram illustrating a hardware configuration example of core base station 10. Core base station 10 of FIG. 2 corresponds to core base station CND1 of FIG. 1. Core base station 10 is configured to include wireless multi-hop path manager 11, peripheral base station wireless line quality monitor 12, access line transmitter and receptor 13, wireless multi-hop downstream side transmitter and receptor 14, wire backhaul transmitter and receptor 15, user data processor 16, and memory M1.

Memory M1 is configured by using, for example, a random access memory (RAM) and a read only memory (ROM), and a program defining an operation of core base station 10 is stored in the ROM. The RAM is used as a work memory when performing processing such as various calculations in each unit in core base station 10.

Wireless multi-hop path manager 11 is configured by using a processor (for example, a central processing unit (CPU) or a field programmable gate array (FPGA)). Wireless multi-hop path manager 11 inputs and outputs user data signals U and U', peripheral base station wireless line quality signal S1, wireless multi-hop path signal S2, connection desirable terminal identifier S3, and base station power control signal S4 from and to each unit in core base station 10. In the following description, user data signal U may be replaced with user data signal U' generated when user data signal U is processed by user data processor 16.

Peripheral base station wireless line quality monitor 12 measures a quality (that is, a quality of wireless backhaul line WBL) of a wireless line between core base station 10 and one or more sub-base stations around core base station 10 and performs regular monitoring thereon. Peripheral base station wireless line quality monitor 12 transmits peripheral base station wireless line quality signal S1 as a measurement result to wireless multi-hop path manager 11. Peripheral base station wireless line quality signal S1 includes identification information of core base station 10 performing the measurement.

Access line transmitter and receptor 13 performs communication using an access line which accesses with one or more terminals (for example, tablet terminal TB requesting a connection desire to core base station 10, and smartphone SM being connected) to be accommodated in core base station 10. Access line transmitter and receptor 13 receives user data signal U transmitted from the terminal and transmits a user data signal to wireless multi-hop path manager 11 and user data processor 26, or transmits user data signal U from wireless multi-hop path manager 11 to the terminal. Access line transmitter and receptor 13 receives connection desire terminal identifier S3 transmitted from a terminal (for example, tablet terminal TB) requesting a connection desire with core base station 10 during a collection period (for example, approximately 5 seconds) which will be described below and transmits a connection desire terminal identifier to wireless multi-hop path manager 11.

Wireless multi-hop downstream side transmitter and receptor 14 as an example of a communicator is connected to wireless multi-hop downstream side base station WMDBs by wireless multi-hop to perform a wireless communication. In the example of FIG. 1, wireless multi-hop downstream side base station WMDBs for core base station CND1 becomes sub-base stations BS2, BS3, BS4, BS5, and BS14, but wireless multi-hop downstream side base station is not limited to being sub-base stations BS2, BS3, BS4, BS5, and BS14 depending on the wireless multi-hop path and may be another sub-base station (for example, sub-base station BS9, see FIG. 6). Wireless multi-hop downstream side transmitter and receptor 14 transmits user data signal U from wireless multi-hop path manager 11 to wireless multi-hop downstream side base station WMDBs or transmits user data signal U from wireless multi-hop downstream side base station WMDBs to wireless multi-hop path manager 11. Wireless multi-hop downstream side transmitter and receptor 14 receives peripheral base station wireless line quality signal S1 or connection desire terminal identifier S3 transmitted from wireless multi-hop downstream side base station WMDBs and transmits the received signals to wireless multi-hop path manager 11. Wireless multi-hop downstream side transmitter and receptor 14 transmits wireless multi-hop path signal S2 or base station power control signal S4 from wireless multi-hop path manager 11 to wireless multi-hop downstream side base station WMDBs.

Wire backhaul transmitter and receptor 15 is connected to backbone network CNW by wire backhaul line LL to perform a wire communication. Wire backhaul transmitter and receptor 15 transmits user data signal U from wireless multi-hop path manager 11 to network management server 50 of backbone network CNW or transmits user data signal U from network management server 50 of backbone network CNW to wireless multi-hop path manager 11. Wire backhaul transmitter and receptor 15 transmits peripheral base station wireless line quality signal S1 or connection desire terminal identifier S3 from wireless multi-hop path manager 11 to network management server 50 of backbone network CNW via wire backhaul line LL. Wire backhaul transmitter and receptor 15 transmits wireless multi-hop path signal S2 or base station power control signal S4 from network management server 50 of backbone network CNW to wireless multi-hop path manager 11.

In backbone network CNW, network management server 50 is connected to core base station 10 by wire backhaul line LL to perform a wire communication. Network management server 50 receives peripheral base station wireless line quality signal S1 or connection desire terminal identifier S3 from core base station 10. Network management server 50 transmits wireless multi-hop path signal S2 or base station power control signal S4 to core base station 10.

User data processor 16 is used for processing by, for example, edge computing of core base station 10, receives user data signal U received by access line transmitter and receptor 13 and performs predetermined processing (for example, video compression, data mining processing), and generates user data signal U'. User data processor 16 transmits user data signal U' to wireless multi-hop path manager 11. That is, user data processor 16 can perform processing such as reducing a data size of input user data signal U. Thereby, core base station 10 can reduce the transmission and reception transmission amount for data sharing between small cell 5G base stations or between terminals, thereby, reducing the required transmission and reception time and reducing power consumption of the small cell 5G base station.

Figure 3:
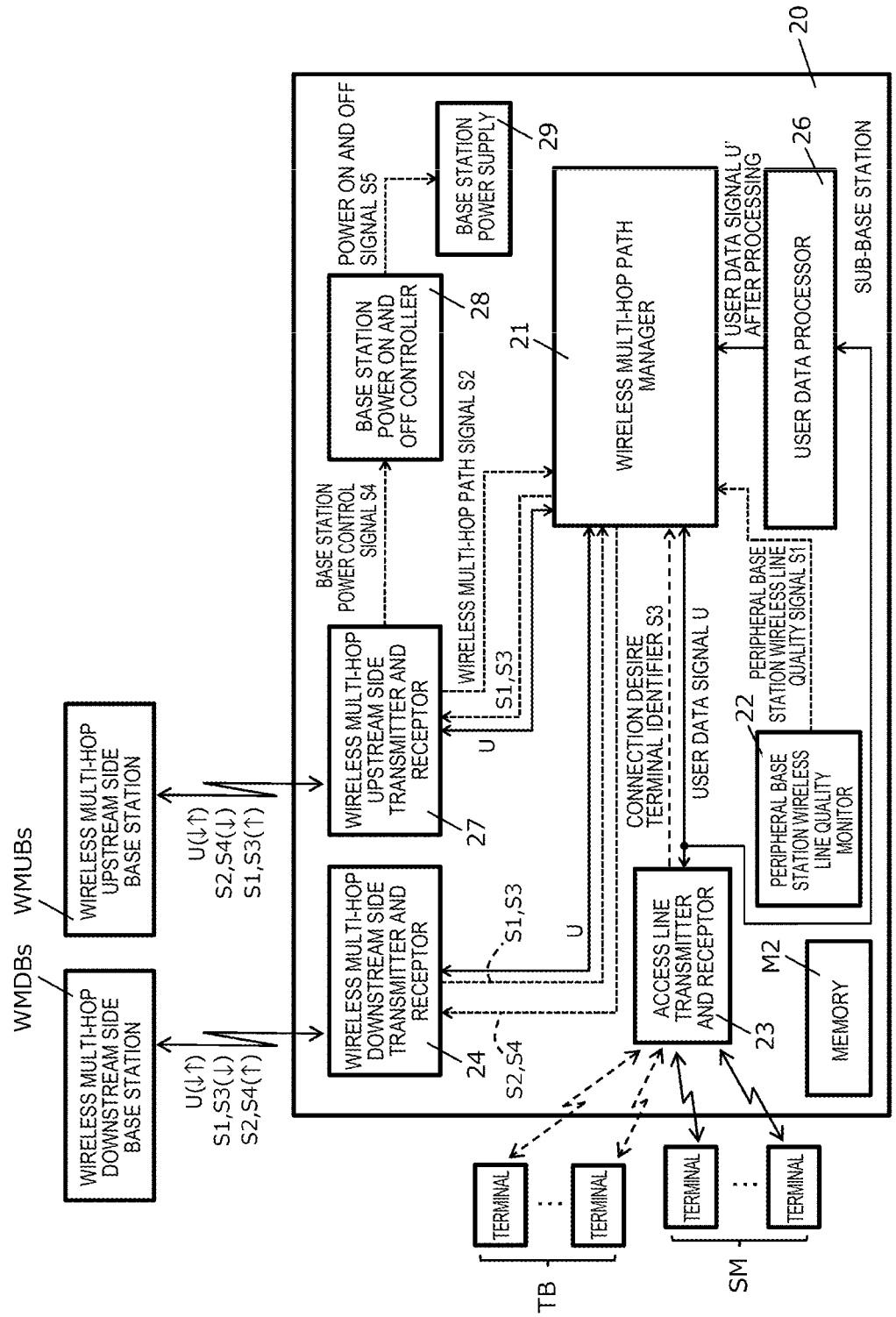
FIG. 3 is a block diagram illustrating a hardware configuration example of a sub-base station.

FIG. 3 is a block diagram illustrating a hardware configuration example of sub-base station 20. Sub-base station 20 of FIG. 3 corresponds to each of sub-base stations BS2 to BS16 of FIG. 1. Sub-base station 20 is configured to include wireless multi-hop path manager 21, peripheral base station wireless line quality monitor 22, access line transmitter and receptor 23, wireless multi-hop downstream side transmitter and receptor 24, user data processor 26, wireless multi-hop upstream side transmitter and receptor 27, base station power on and off controller 28, base station power supply 29, and memory M2. In description of FIG. 3, the same components as components of FIG. 2 are denoted by the same reference numerals to simplify or omit description thereof, and different contents will be described.

Memory M2 is configured by using, for example, RAM and ROM, and a program defining an operation of sub-base station 20 is stored in a ROM. A RAM is used as a work memory when performing processing such as various operations in each unit in sub-base station 20.

Wireless multi-hop path manager 21 is configured by using a processor (for example, a CPU or a FPGA). Wireless multi-hop path manager 21 receives and outputs user data signals U and U', peripheral base station wireless line quality signal S1, wireless multi-hop path signal S2, connection desire terminal identifier S3, and base station power control signal S4 from and to each unit in the sub-base station 20. In the following description, user data signal U may be replaced with user data signal U' generated by processing of user data processor 26. When wireless multi-hop path manager 21 as an example of a path manager acquires a determination result that the related station (that is, sub-base station 20) is an active base station (see below description) from network management server 50, a wireless multi-hop path manager sets a wireless multi-hop path of the related station, based on wireless multi-hop path signal S2 transmitted from network management server 50. Here, in wireless system 100, the active base station is a group of base stations configured with core base station 10 and a part of the plurality of sub-base stations 20, which is determined to be required to be turned on (that is, in an active state) by network management server 50 in order to satisfy traffic conditions (see below) and a predetermined power consumption amount criterion (see FIG. 1, FIG. 6, and FIG. 7).

Peripheral base station wireless line quality monitor 22 measures quality (that is, the quality of wireless backhaul line WBL) of a wireless line between sub-base station 20 and core base station 10 around sub-base station 20 or between the core base station and one or more sub-base stations 20 and performs regular monitoring thereon. Peripheral base station wireless line quality monitor 22 transmits peripheral base station wireless line quality signal S1 as a measurement result to wireless multi-hop path manager 21. Peripheral base station wireless line quality signal S1 includes identification information of sub-base station 20 performed the measurement.

Access line transmitter and receptor 23 performs communication using an access line between one or more terminals (for example, tablet terminal TB requesting a connection desire to sub-base station 20, and connected smartphone SM) becoming an accommodation target of sub-base station 20. Access line transmitter and receptor 23 receives user data signal U transmitted from a terminal and transmits a user data signal to wireless multi-hop path manager 21 and user data processor 26, or transmits user data signal U from wireless multi-hop path manager 21 to the terminal. Access line transmitter and receptor 23 receives connection desire terminal identifier S3 transmitted from the terminal (for example, tablet terminal TB) requesting a connection desire to sub-base station 20 and transmits the connection desire terminal identifier to wireless multi-hop path manager 21 during a collection period (for example, approximately 5 seconds) which will be described below.

Wireless multi-hop downstream side transmitter and receptor 24 as an example of the communicator is connected to wireless multi-hop downstream side base station WMDBs by wireless multi-hop to perform a wireless communication. In the example of FIG. 1, wireless multi-hop downstream side base station WMDBs for sub-base station BS2 becomes sub-base station BS7, but a wireless multi-hop downstream side base station is not limited to being sub-base station BS7 depending on a path of the wireless multi-hop and may be another sub-base station (for example, sub-base station BS16, see FIG. 7). Wireless multi-hop downstream side transmitter and receptor 24 transmits user data signal U from wireless multi-hop path manager 21 to wireless multi-hop downstream side base station WMDBs, or transmits user data signal U from wireless multi-hop downstream side base station WMDBs to wireless multi-hop path manager 21. Wireless multi-hop downstream side transmitter and receptor 24 receives peripheral base station wireless line quality signal S1 or connection desire terminal identifier S3 transmitted from wireless multi-hop downstream side base station WMDBs and transmits received identifier and signal to the wireless multi-hop path manager 21. Wireless multi-hop downstream side transmitter and receptor 24 transmits wireless multi-hop path signal S2 or base station power control signal S4 from wireless multi-hop path manager 21 to wireless multi-hop downstream side base station WMDBs.

User data processor 26 is used for processing by, for example, edge computing of sub-base station 20, receives user data signal U received by access line transmitter and receptor 23 and performs predetermined processing (for example, video compression and data mining processing), and generates user data signal U'. User data processor 26 transmits user data signal U' to wireless multi-hop path manager 21. That is, user data processor 26 can perform processing such as reducing a data size of input user data signal U. Thereby, sub-base station 20 can reduce transmission and reception transmission amounts for data sharing between small cell 5G base stations or between terminals, thereby, reducing the required transmission and reception time and reducing a power consumption amount of the small cell 5G base station.

Wireless multi-hop upstream side transmitter and receptor 27 as an example of a communicator is connected to wireless multi-hop upstream side base station WMUBs by wireless multi-hop to perform a wireless communication. In the example of FIG. 1, wireless multi-hop upstream side base station WMUBs for sub-base station BS7 becomes sub-base station BS2, but the wireless multi-hop upstream side base station is not limited to being sub-base station BS2 depending on a wireless multi-hop path and may be core base station CND1 or another sub-base station (for example, sub-base station BS6). Wireless multi-hop upstream side transmitter and receptor 27 transmits user data signal U from wireless multi-hop path manager 21 to wireless multi-hop upstream side base station WMUBs or transmits user data signal U from wireless multi-hop upstream side base station WMUBs to wireless multi-hop path manager 21. Wireless multi-hop upstream transmitter and receptor 27 receives wireless multi-hop path signal S2 or base station power control signal S4 transmitted from wireless multi-hop upstream side base station WMUBs, transmits wireless multi-hop path signal S2 to wireless multi-hop path manager 21, and transmits base station power control signal S4 to base station power on and off controller 28. Wireless multi-hop upstream side transmitter and receptor 27 transmits peripheral base station wireless line quality signal S1 or connection desire terminal identifier S3 from wireless multi-hop path manager 21 to wireless multi-hop upstream side base station WMUBs.

Base station power on and off controller 28 as an example of a controller generates power on and off signal S5 for turning on or off base station power supply 29 and transmits power on and off signal to base station power supply 29, based on base station power control signal S4 from wireless multi-hop upstream side transmitter and receptor 27. That is, base station power on and off controller 28 controls an active state or a sleep state of the related station, based on the determination result obtained by network management server 50 on whether or not the active base station satisfies a traffic condition and a predetermined power consumption amount criterion. Specifically, when base station power control signal S4 is "powered on" (that is, when a determination result that the related station is the active base station is obtained), power on and off signal S5 for performing power-on (that is, to maintain the active state) of base station power supply 29 is generated. Meanwhile, when base station power control signal S4 is "powered off" (that is, when the determination result that the related station is not the active base station is obtained), power on and off signal S5 for performing power-off (that is, to shift to sleep state) of base station power supply 29 is generated.

Base station power supply 29 supplies power necessary to operate each unit of sub-base stations 20. Base station power supply 29 supplies power necessary for each unit of sub-base stations 20 or stops supplying power necessary for each unit of sub-base stations 20 in response to power on and off signal S5 from base station power on and off controller 28. Thereby, sub-base stations 20 are shifted to the active state (that is, the power on state) or the sleep state so as to appropriately manage the power efficiency of wireless system 100 according to the determination result of network management server 50.

Figure 4:
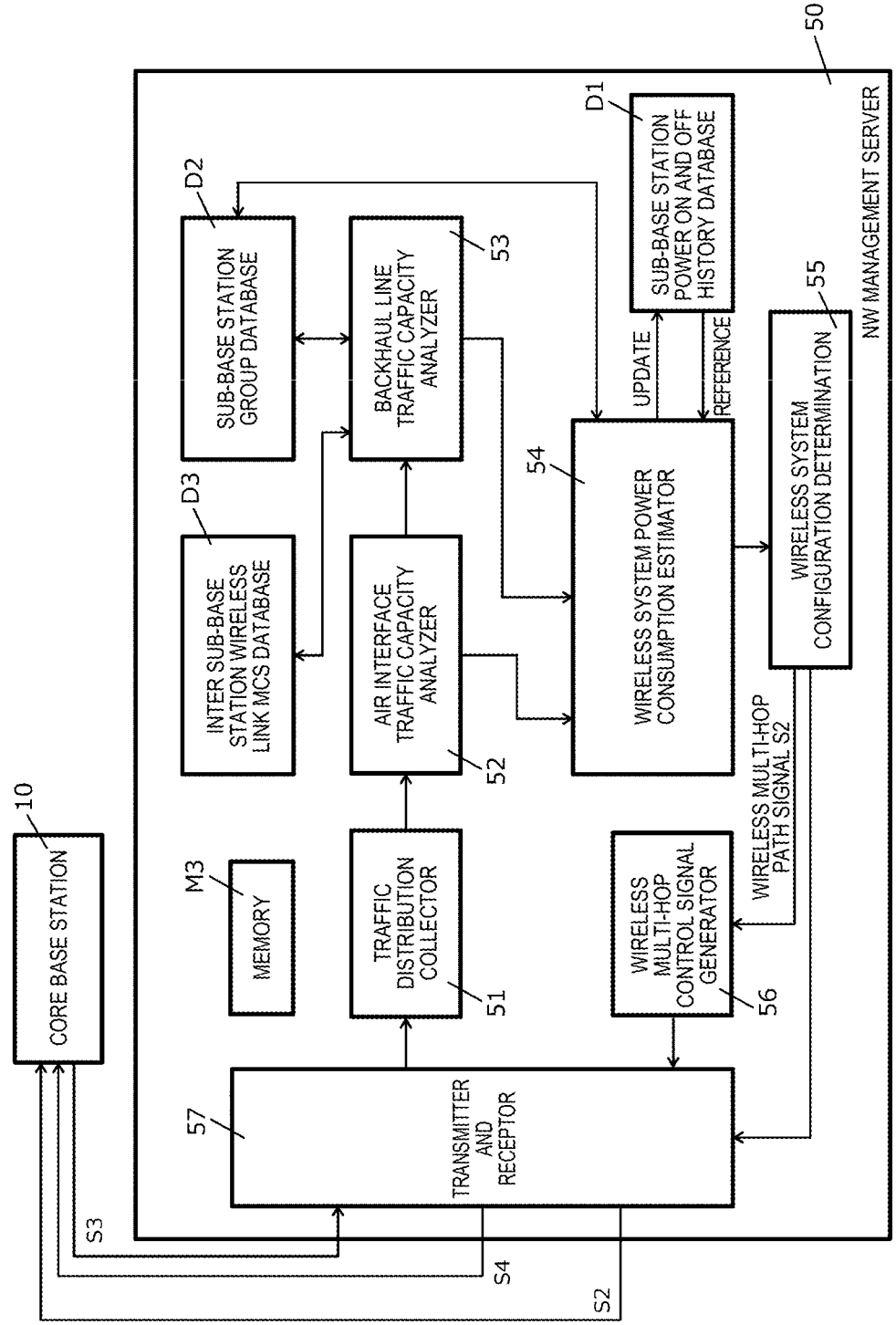
FIG. 4 is a block diagram illustrating a hardware configuration example of a network management server.

FIG. 4 is a block diagram illustrating a hardware configuration example of network management server 50. Network management server 50 is configured to include traffic distribution collector 51, air interface traffic capacity analyzer 52, backhaul line traffic capacity analyzer 53, wireless system power consumption estimator 54, wireless system configuration determiner 55, wireless multi-hop control signal generator 56, transmitter and receptor 57, sub-base station power on and off history database D1, sub-base station group database D2, inter-sub-base station wireless link MCS database D3, and memory M3. Traffic distribution collector 51, air interface traffic capacity analyzer 52, backhaul line traffic capacity analyzer 53, wireless system power consumption estimator 54, wireless system configuration determiner 55, and wireless multi-hop control signal generator 56 are configured by using a processor (for example, a central processing unit (CPU) or a field programmable gate array (FPGA)).

Memory M3 is configured by using, for example, a RAM and a ROM, and a program defining an operation of network management server 50 is stored in the ROM. The RAM is used as a work memory when performing processing such as various calculations in each unit if network management server 50. Memory M3 holds (stores) data or information regarding a predetermined power consumption amount criterion that is preferable in operation of the wireless system 100.

Traffic distribution collector 51 collects a traffic distribution (for example, a traffic volume indicating how many terminals want to be connected to which position in a communication area) as an example of the traffic condition of one or more terminals accommodated in the respective communication areas of core base station 10 and all sub-base stations 20 temporarily in the active state during a predetermined period (see FIG. 8) of, for example, approximately 5 seconds. Specifically, traffic distribution collector 51 collects a total amount of connection desire terminal identifiers S3 for core base station 10 and each of all sub-base stations 20 temporarily in the active state during the above-described predetermined period as a traffic condition (traffic distribution) and transmits the collected result to air interface traffic capacity analyzer 52. Traffic distribution collector 51 may collect the traffic volume for core base station 10 and each of all sub-base stations 20 or a combination of each traffic volume and a total amount of corresponding connection desire terminal identifier S3, instead of connection desire terminal identifier S3 for core base station 10 and each of all sub-base stations 20.

Air interface traffic capacity analyzer 52 analyzes and extracts a combination of core base station 10 and at least a part of sub-base stations 20 which can accommodate traffic of an air interface line, based on the collection result (that is, a traffic condition for the air interface line) of traffic distribution collector 51 and the assumed combination of power on and off states PW(i) of respective sub-base stations 20. Air interface traffic capacity analyzer 52 transmits an analysis result to backhaul line traffic capacity analyzer 53 and wireless system power consumption estimator 54. Here, state PW(i)=1 indicates that the power of sub-base station 20 is on. Meanwhile, state PW(i)=0 indicates that the power of sub-base station 20 is off. Variable i indicates an ordinal number of the sub-base station illustrated in FIG. 1. In the system configuration example of FIG. 1, the number of installed sub-base stations is 15, and thus, i is one variable taken from 1 to 15.

Air interface traffic capacity analyzer 52 may perform analysis, for example, in view of the following aspects. For example, in the first aspect, as the modulation and coding scheme (MCS) of the air interface increases, the required transmission and reception time is reduced. In the second aspect, as the number of terminals to be connected to one base station (specifically, core base station 10 or sub-base station 20) is reduced, a transmission and reception time rate of the base station is reduced.

Backhaul line traffic capacity analyzer 53 analyzes and extracts a combination of core base station 10 and at least a part of sub-base stations 20 which can accommodate the traffic of wireless backhaul line WBL in order to narrow down from an analysis result of air interface traffic capacity analyzer 52 by using sub-base station group database D2 and inter sub-base station wireless link MCS database D3. Backhaul line traffic capacity analyzer 53 transmits the analysis result to wireless system power consumption estimator 54.

Backhaul line traffic capacity analyzer 53 may perform analysis comprehensively in view of edge computing (for example, data compression) of core base station 10 and each of sub-base stations 20. This is because the amount of data to be transferred can be reduced when it is permitted to transfer on wireless backhaul line WBL after data compression and the like are performed by the edge computing in the base stations (specifically, core base station 10 and sub-base stations 20). Backhaul line traffic capacity analyzer 53 may perform analysis comprehensively in view of whether or not to limit the base stations to share data. This is because the amount of data to be transferred can be reduced when it is not necessary to transfer upline data from a terminal to the base station (specifically, core base station 10 or sub-base station 20) to backbone network CNW and it is sufficient to transfer only to adjacent base stations of limited number.

Backhaul line traffic capacity analyzer 53 may perform analysis, for example, in view of the following aspect. For example, in the first aspect, as MCS of wireless backhaul line WBL is in a high rank, required transmission and reception time is reduced. In the second aspect, as the amount of data to be transferred on wireless backhaul line WBL is reduced, a transmission and reception time rate is reduced.

Wireless system power consumption estimator 54 estimates and calculates the entire power consumption amount of wireless system 100 for each combination of extracted core base station 10 and at least a part of sub-base stations 20 (see Table 1) by using the analysis result of air interface traffic capacity analyzer 52, the analysis result of backhaul line traffic capacity analyzer 53, sub-base station power on and off history database D1, and sub-base station group database D2. Wireless system power consumption estimator 54 transmits the estimated calculation result of the entire power consumption amount of wireless system 100 for each combination of core base station 10 and at least a part of sub-base stations 20 to wireless system configuration determiner 55 to store in sub-base station power on and off history database D1 and updates the calculation result to the latest content.

Figure 6:
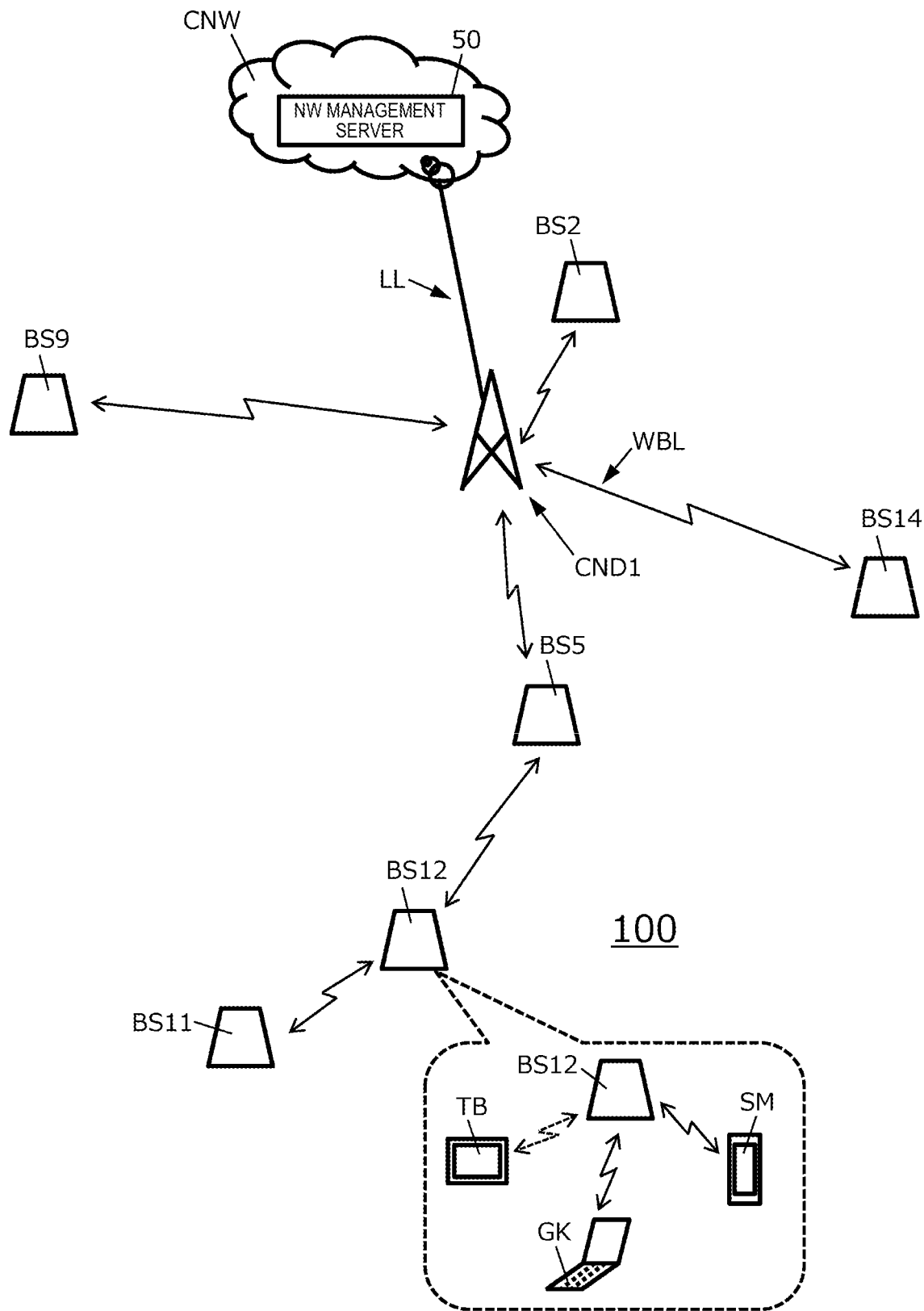
FIG. 6 is a diagram schematically illustrating another system configuration example of the wireless system according to the first embodiment.
Figure 7:
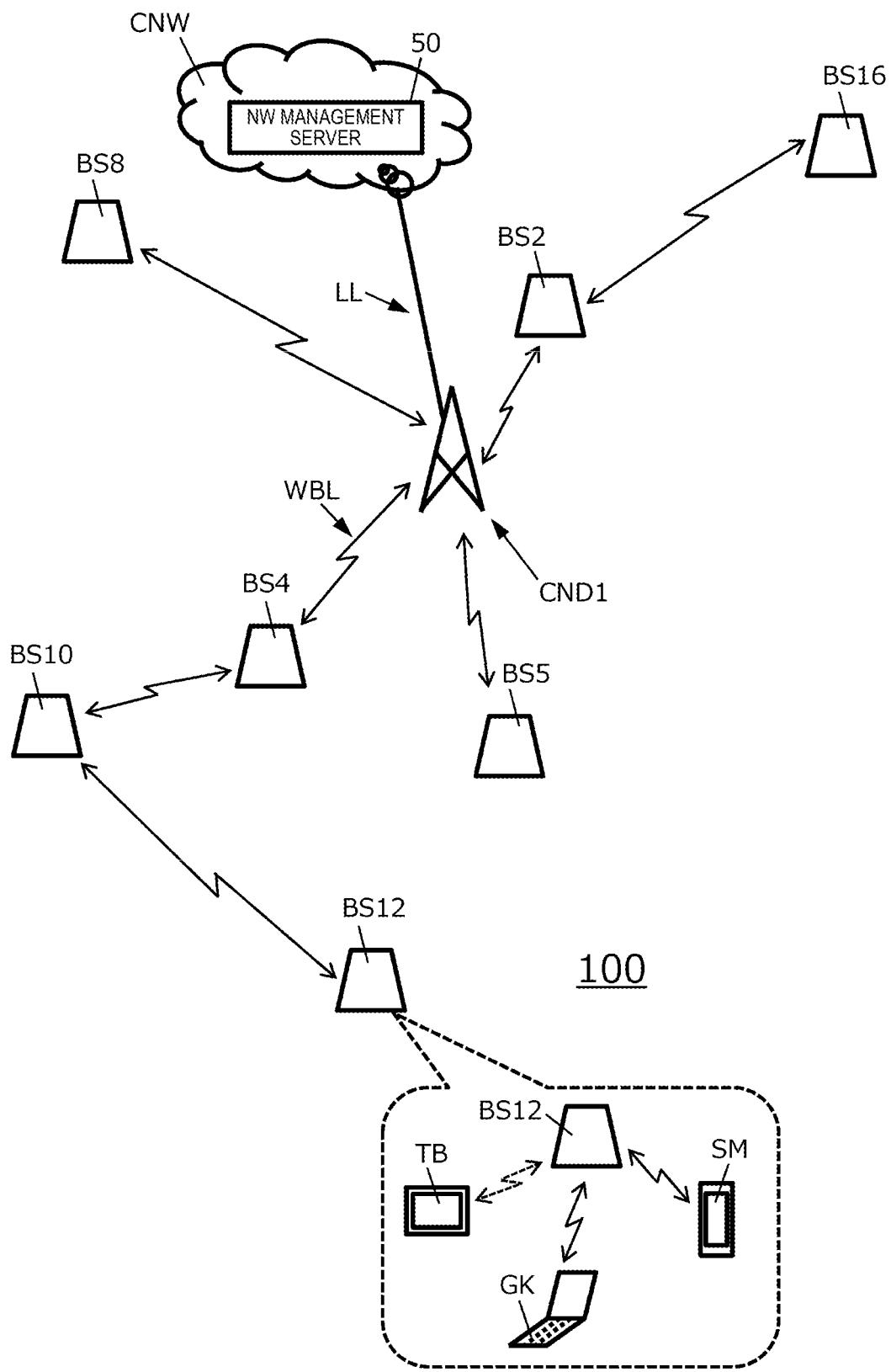
FIG. 7 is a diagram schematically illustrating still another system configuration example of the wireless system according to the first embodiment.

FIG. 5 is a diagram illustrating an example of a correspondence relationship between a combination of the sub-base stations in different power on and off states and a wireless multi-hop path pattern. FIGS. 6 and 7 are diagrams schematically illustrating another system configuration example of wireless system 100 according to the first embodiment. Combinations (for example, three types) of PW(i) illustrated in FIG. 5 are a candidate example of a group of base stations configured by the core base station 10 and at least a part of sub-base stations 20 extracted by each of air interface traffic capacity analyzer 52 and backhaul line traffic capacity analyzer 53.

For example, a first candidate (see (1) of FIG. 5) corresponds to the configuration of wireless system 100 of FIG. 1, and core base station 10 (specifically, core base station CND1) and all sub-base stations 20 (specifically, sub-base stations BS2 to BS16) are powered on (that is, PW(1)=1). That is, the first candidate corresponds to one of the path patterns of wireless backhaul line WBL configured by the active base station including core base station 10 and all sub-base stations 20.

A second candidate (see (2) of FIG. 5) corresponds to the configuration of wireless system 100 of FIG. 6, and core base station 10 and the plurality of sub-base stations 20 (specifically, six sub-base stations BS2, BS5, BS9, BS11, BS12, and B514) are powered on (that is, PW(1)=1). The second candidate corresponds to one of the path patterns of wireless backhaul line WBL configured by an active base station including core base station 10 and six sub-base stations. A configuration example of wireless system 100 in FIG. 6, is different from the configuration example of the wireless system in FIG. 1 in that core base station CND1 is connected to sub-base station BS9 by wireless multi-hop.

A third candidate (see (3) of FIG. 5) corresponds to the configuration of wireless system 100 of FIG. 6, and core base station 10 and the plurality of sub-base stations 20 (specifically, six sub-base stations BS2, BS5, BS9, BS11, BS12, and BS14) are powered on (that is, PW(1)=1). The second candidate corresponds to one of the path patterns of wireless backhaul line WBL configured by an active base station including core base station 10 and six sub-base stations. The configuration example of wireless system 100 in FIG. 7 is different from the configuration example of the wireless system in FIG. 1 in that core base station CND1 is connected to sub-base station BS8 by wireless multi-hop, sub-base station BS2 is connected to sub-base station BS16 by the wireless multi-hop, and sub-base station BS10 is connected to sub-base station BS12 by the wireless multi-hop.

TABLE 1

| | Combination | | |
|---|---|---|---|
| Base Station | (1)-1 A + B + C (Power Consumption Amount) | (2)-2 A + B + C (Power Consumption Amount) | (3)-4 A + B + C (Power Consumption Amount) |
| 1 | 12 + 0 + 300 | 30 + 0 + 300 | 26 + 0 + 300 |
| 2 | 18 + 20 + 100 | 54 + 54 + 100 | 24 + 39 + 100 |
| 3 | 6 + 31 + 100 | 0 | 0 |
| 4 | 12 + 26 + 100 | 0 | 12 + 12 + 100 |
| 5 | 30 + 68 + 100 | 30 + 75 + 100 | 51 + 51 + 100 |
| 6 | 8 + 18 + 100 | 0 | 0 |
| 7 | 2 + 2 + 100 | 0 | 0 |
| 8 | 15 + 25 + 100 | 0 | 33 + 33 + 100 |
| 9 | 10 + 10 + 100 | 57 + 57 + 100 | 0 |
| 10 | 14 + 14 + 100 | 0 | 22 + 70 + 100 |
| 11 | 20 + 20 + 100 | 27 + 27 + 100 | 0 |
| 12 | 18 + 38 + 100 | 18 + 45 + 100 | 48 + 48 + 100 |
| 13 | 4 + 4 + 100 | 0 | 0 |
| 14 | 10 + 14 + 100 | 24 + 24 + 100 | 0 |
| 15 | 2 + 10 + 100 | 0 | 0 |
| 16 | 8 + 8 + 100 | 0 | 15 + 15 + 100 |
| SUM | 189 + 308 + 1800 = 2297 | 240 + 282 + 900 = 1422 | 231 + 268 + 1000 = 1499 |

Here, an estimation operation example of wireless system power consumption estimator 54 will be described with reference to Table 1. Wireless system power consumption estimator 54 estimates and calculates transmission and reception power consumption amount A relating to the air interface line, transmission and reception power consumption amount B relating to the wireless backhaul line, and power consumption amount C associated with an operation of the base station regardless of transmission and reception and obtains Addition value (A+B+C). In order to make the description easy to understand, power consumption amount C of core base station CND1 is set to 300, and power consumption amount C of each of sub-base stations BS2 to BS16 is set to 100.

In the first candidate (see (1)-1 of FIG. 5) of Table 1, for example, when power consumption amount A of sub-base station BS2 is set to 18 and power consumption amount A of sub-base station BS7 is set to 2, wireless system power consumption estimator 54 calculates power consumption amount B of sub-base station BS2 as 20 (=18+2). This is because sub-base station BS2 not only performs transmission and reception relating to the air interface line of sub-base station BS2 (A=18) but also accommodates traffic (A=2) relating to the air interface line of sub-base station BS7 on a downstream side connected by the wireless multi-hop to be transmitted to core base station CND1 on an upstream side by the wireless multi-hop.

Likewise, in the first candidate (see (1)-1 of FIG. 5) of Table 1, for example, when power consumption amount A of sub-base station BS5 is set to 30, power consumption amount A of sub-base station BS12 is set to 18, and power consumption amount A of sub-base station BS11 is set to 20, wireless system power consumption estimator 54 calculates power consumption amount B of sub-base station BS5 as 68 (=30+(18+20)). This is because sub-base station BS5 not only performs transmission and reception relating to the air interface line of sub-base station BS5 (A=30) but also accommodates traffic (A=18 and 20) relating to the air interface line of each of sub-base stations BS12 and BS11 on a downstream side connected by the wireless multi-hop to be transmitted to core base station CND1 on an upstream side by the wireless multi-hop.

In the second candidate (see (2)-2 of FIG. 5) of Table 1, for example, sub-base stations BS3, BS4, BS6, BS7, BS8, BS10, BS13, BS15, and BS16 are determined to be inactive base stations, thereby, being in a sleep state. Therefore, transmission and reception power consumption amount B relating to the wireless backhaul line of sub-base stations BS3, BS4, BS6, BS7, BS8, BS10, BS13, BS15 and BS16 is zero (0).

Likewise, in the third candidate (see (3)-4 of FIG. 5) of Table 1, for example, sub-base stations BS3, BS6, BS7, BS9, BS11, BS13, BS14, and BS15 are determined to be the inactive base stations, thereby, being in the sleep state. Therefore, transmission and reception power consumption amount B relating to the wireless backhaul line of sub-base stations BS3, BS4, BS6, BS7, BS8, BS10, BS13, BS15 and BS16 is zero (0).

Furthermore, in the second candidate (see (2)-2 in FIG. 5) of Table 1, for example, it is considered that transmission and reception relating to an air interface line with a terminal (that is, a terminal in a communication area of sub-base station BS10) accommodated before sub-base station BS10 enters the sleep state are performed substantially equally by the neighboring active base station (for example, each of the sub-base stations BS11 and BS9). In this case, the active base station (for example, each of sub-base stations BS11 and BS9) calculates power consumption amount A (=14) relating to the air interface line of sub-base station BS10 before entering the sleep state as "7", and calculates power consumption A of the related station as "27" (=20+7) and "57" (=50+7) so as to be equally accommodated as "7".

It goes without saying that some examples described above are listed in a limited manner to make description easy to understand and the numerical examples illustrated in Table 1 are equally applicable to a relationship between different other sub-base stations.

Wireless system power consumption estimator 54 may estimate and calculate the entire power consumption amount of wireless system 100 in consideration of whether or not the transmission power of core base station 10 and each of sub-base stations 20 can be changed from the maximum value. This is because transmission power of the base station when transmission can be reduced, if a transmission power control can be performed to reduce transmission power of the base station (specifically, core base station 10 and sub-base station 20) within a range that does not affect reduction in MCS.

Wireless system configuration determiner 55 as an example of a determiner determines sub-base station 20 (in other words, determination of power on and off of each sub-base station 20) to become an active base station by using the estimated calculation result of the entire power consumption amount of wireless system 100 for each combination of extracted core base station 10 and at least part of sub-base stations 20. As described above, core base station 10 is included in the active base station. Wireless system configuration determiner 55 determines and generates wireless multi-hop path signal S2 for connecting the active base stations by the wireless multi-hop, based on the determination result as to whether or not to set each sub-base station 20 as the active base station, and transmits a wireless multi-hop path signal to wireless multi-hop control signal generator 56. Wireless system configuration determiner 55 generates base station power control signal S4 for maintaining or changing power of the sub-base station determined to be the active base station as an on state, or shifting or maintaining the sub-base station not determined to be the active base station as a sleep state, and transmits the base station power control signal to core base station 10 via transmitter and receptor 57. Base station power control signal S4 is transmitted from core base station 10 to corresponding sub-base station 20 directly or by the wireless multi-hop.

Wireless multi-hop control signal generator 56 includes wireless multi-hop path signal S2 from wireless system configuration determiner 55, generates a control signal for instructing each sub-base station 20 corresponding to the active base station to set a path of wireless multi-hop, and transmits a control signal to core base station 10 via transmitter and receptor 57. The control signal is transmitted from core base station 10 to each sub-base station determined as the corresponding active base station directly or by the wireless multi-hop.

Transmitter and receptor 57 having a function as a communication interface of network management server 50 is connected to core base station 10 by wire backhaul line LL, and performs a wire communication with core base station 10.

Sub-base station power on and off history database D1 as an example of a history database is configured by using, for example, a hard disk drive (HDD) or a solid state drive (SSD). Sub-base station power on and off history database D1 holds (stores) the estimated calculation result (one example of the estimated result) of the power consumption amount of wireless system 100 calculated immediately before and a history of the active state or the sleep state in association with each other, for each of all sub-base stations 20 (for example, sub-base stations BS2 to BS16 in FIG. 1) configuring wireless system 100.

Sub-base station group database D2 is configured by using, for example, the HDD or the SSD. Sub-base station group database D2 holds information on a group (hereinafter, may be referred to as a "data sharing group") configured by a plurality of adjacent sub-base stations that has to share user data signal U. For example, in the example of wireless system 100 of FIG. 1, core base station CND1 and sub-base stations BS3, BS8, and BS9 form the data sharing group. In the same figure, core base station CND1 and sub-base stations BS5, BS12, and BS11 form the data sharing group. A configuration of the data sharing group may be fixedly determined when respective sub-base stations BS2 to BS16 configuring wireless system 100 are placed as illustrated in FIG. 1 or may be dynamically changed by wireless system configuration determiner 55.

Inter-sub-base station wireless link MCS database D3 is configured by using, for example, the HDD or the SSD. Inter-sub-base station wireless link MCS database D3 holds (stores) a correspondence relationship between the base stations and the MCS value of the wireless link between the base stations, based on the (known) distance between base stations determined when wireless system 100 (specifically, core base station CND1 and respective sub-base stations BS2 to BS16) of FIG. 1 is located.

Operation of Wireless Communication System

Figure 8:
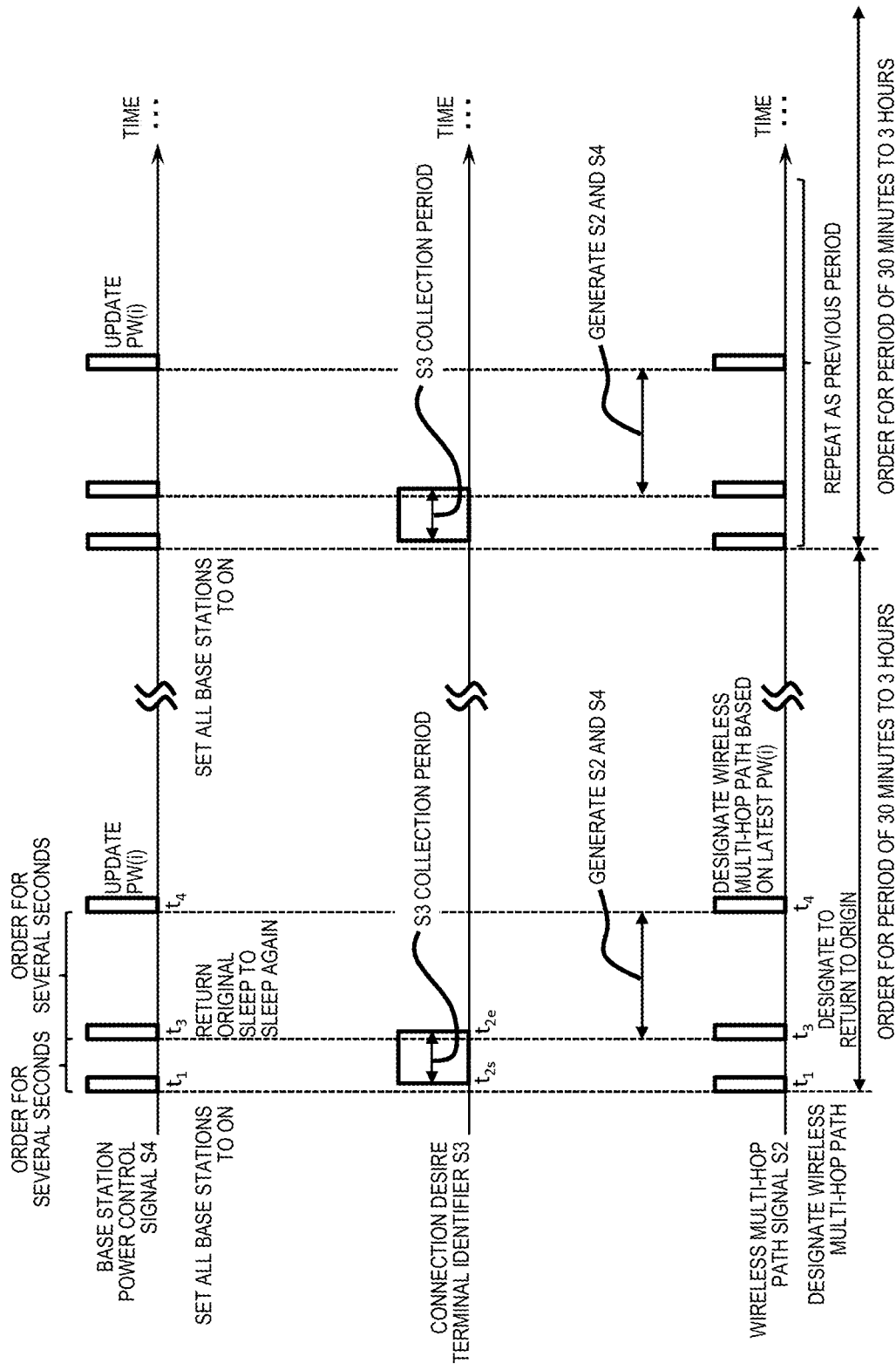
FIG. 8 is a timing chart illustrating a power control sequence of the sub-base station in time series.
Figure 9:
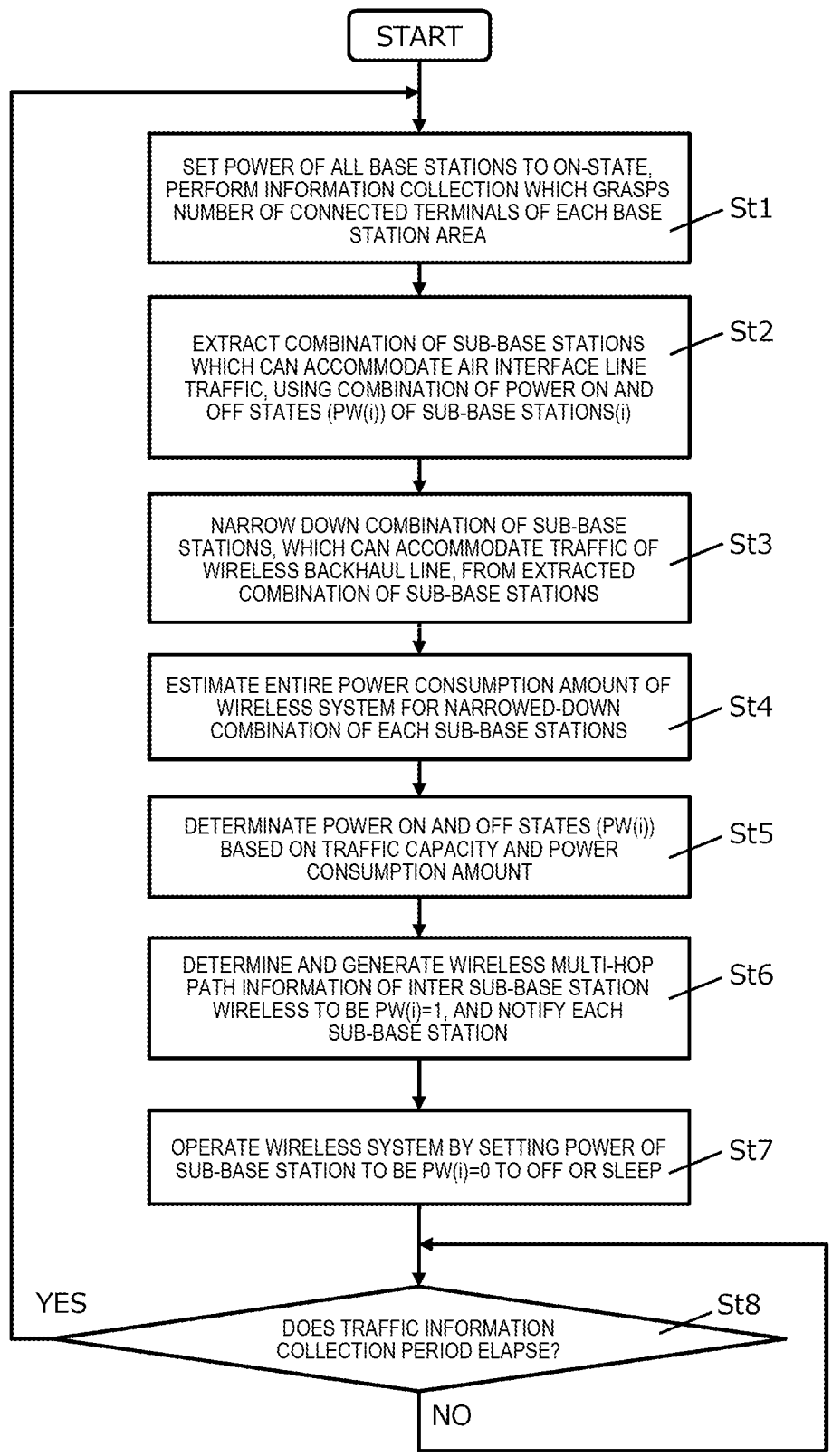
FIG. 9 is a flowchart illustrating an operation sequence example of the network management server of the wireless system according to the first embodiment.

Next, an operation of wireless system 100 according to the first embodiment will be described with reference to FIGS. 8 and 9. FIG. 8 is a timing chart illustrating a power control sequence of sub-base station 20 in time series. FIG. 9 is a flowchart illustrating an operation sequence example of network management server 50 of wireless system 100 according to the first embodiment.

In FIGS. 8 and 9, in network management server 50, wireless system configuration determiner 55 generates a control signal for temporarily shifting all sub-base stations BS2 to BS16 configuring wireless system 100 to the active state (in other words, the operation state) at time t1 (see FIG. 8) which is the start timing in a predetermined collection period (for example, order for several seconds of approximately 5 seconds) and wireless multi-hop path signal S2 when all sub-base stations BS2 to BS16 enter an active state. Network management server 50 transmits this control signal to each of all sub-base stations BS2 to BS16 via core base station CND1 in response to wireless multi-hop path signal S2 (St1).

Each of all sub-base stations BS2 to BS16 temporarily enters the active state (specifically, a period of time t1 to time t3 in FIG. 8). Core base station CND1 and each of all sub-base stations BS2 to BS16 collect the traffic distribution (for example, connection desire terminal identifier S3) of one or more terminals accommodated in the communication area of the related station during a period (that is, a collection period of connection desire terminal identifier S3) of time t2s to t2e, and report the traffic distribution to network management server 50 via core base station CND1. A period of (time t3 to time t1) is the same as the period of (time t2e to time t2s). In network management server 50, distribution collector 51 collects the number of connected terminals (in other words, the traffic distribution (for example, connection desire terminal identifier S3) of a terminal) of the communication area reported from core base station CND1 and each of all sub-base stations BS2 to BS16 (St1).

Network management server 50 generates a control signal for causing the sub-base station to enter the sleep state again in wireless system configuration determiner 55 when there is a part of the sub-base stations in the sleep state prior to time t1 at time t3 (see FIG. 8) which is the end timing of the collection period described above. Network management server 50 transmits a control signal to the corresponding sub-base station via core base station CND1. Thereby, since the sub-base station that is originally in the sleep state returns to the sleep state again, the power consumption amount of wireless system 100 can be reduced on the whole by limiting the sub-base station to the active state only in the traffic distribution collection period of step St1.

Processing of steps St2 to St6 is performed during time t3 to time t4 illustrated in FIG. 8.

Specifically, in network management server 50 (St2), air interface traffic capacity analyzer 52 analyzes and extracts a combination of core base station 10 and at least a part of sub-base stations 20 which can accommodate the air interface line traffic, based on the collection result (that is, the traffic condition relating to the air interface line) of traffic distribution collector 51 and the assumed combination of power on and off states PW(i) of respective sub-base stations 20 (St2).

In network management server 50, backhaul line traffic capacity analyzer 53 analyzes and extracts a combination of core base station 10 and at least a part of sub-base stations 20 which can accommodate the traffic of wireless backhaul line WBL so as to narrow down from the analysis result in step St2, using sub-base station group database D2 and inter-sub-station wireless link MCS database D3 (St 3).

In network management server 50, wireless system power consumption estimator 54 estimates and calculates the entire power consumption of wireless system 100 for each combination of extracted core base station 10 and at least a part of sub-base stations 20, using the analysis result in step St2, the analysis result in step St3, sub-base station power on and off history database D1, and sub-base station group database D2 (St4).

In network management server 50, wireless system configuration determiner 55 determines sub-base station 20 (in other words, PW(i) indicating determination of power on and off of each of all sub-base stations 20) to be an active base station, using the estimated calculation result of the entire power consumption amount of wireless system 100 for each combination of extracted core base station 10 and at least a part of sub-base stations 20, for example, at time t4. (St5).

In network management server 50, wireless system configuration determiner 55 determines and generates wireless multi-hop path signal S2 for a wireless multi-hop connection between the active base stations, based on the determination result of whether or not each sub-base station 20 becomes the active base station, for example, at time t4 (St6). In network management server 50, wireless system configuration determiner 55 generates base station power control signal S4 for each base station for maintaining the power supply of the sub-base station determined to be the active base station as an on state or changing the power and for shifting a sub-base station not determined to be the active base station to a sleep state or maintaining as the sleep state, and transmits the generated base station power control signal to core base station 10 (St6 and St7). A control signal is transmitted from core base station 10 to each sub-base station determined as the corresponding active base station directly or by the wireless multi-hop. Thereafter, an operation of wireless system 100 is continued until it is time to start the next traffic information collection cycle (for example, 30 minutes to 3 hours). A traffic information collection period indicates a period for periodically reviewing the active base station in consideration of the time change of the traffic required in wireless system 100 such that the power consumption amount during the operation of wireless system 100 satisfies the predetermined power consumption amount criterion stored in memory M3. It is needless to say that the traffic information collection period is set to 30 minutes to 3 hours as an example and the present disclosure is not limited to this.

When the traffic information collection period elapses (St8, YES), the processing of network management server 50 returns to Step St1. Meanwhile, when the traffic information collection period does not elapse (St8, NO), the operation of network management server 50 is in a standby state until the traffic information collection period elapses.

As described above, wireless system 100 according to the first embodiment includes core base station 10 connected to backbone network CNW, the plurality of base stations including the plurality of sub-base stations 20 connected to core base station 10 by the wireless multi-hop, and network management server 50 disposed in backbone network CNW and communicating with core base station 10. Network management server 50 collects traffic conditions of one or more terminals accommodated in the respective communication areas of the plurality of base stations for a predetermined period, satisfies the traffic conditions and the predetermined power consumption amount criterion, and determines a combination of core base station 10 and at least a part of the plurality of sub-base stations 20 as an active base station. Network management server 50 determines path information for connecting the active base station by the wireless multi-hop and notifies the active base station of the path information, and transmits a sleep instruction for setting the sleep state capable of reducing a power consumption amount to other base stations other than the active base station.

Thereby, wireless system 100 can achieve both securement of the system capacity required in the wireless communication and suppression of the power consumption amount of wireless system 100 to a necessary minimum power consumption amount, depending on a time change of a traffic volume. That is, since a transmission distance connected to core base station 10 or sub-base station 20 is reduced for the terminal, a high MCS value can be obtained, and the data transmission and reception time can be reduced. Therefore, the power consumption amounts of the terminal and the small cell 5G base station are reduced. Since there are many small cell 5G base stations, the number of connected terminals per base station can be reduced, and thus, data transmission and reception time can be reduced. Therefore, the power consumption amounts of the terminal and the small cell 5G base station are reduced.

Network management server 50 repeatedly collects traffic conditions and determines an active base station satisfying the traffic conditions and the power consumption amount criterion at each collection. Thereby, wireless system 100 can adaptively determine the active base station according to the traffic conditions that may change from moment to moment, and thus, it is possible to suppress the power consumption amount of wireless system 100.

Network management server 50 satisfies the first traffic condition on the air interface line between each of the plurality of base stations and one or more terminals accommodated in the communication area of the related station of each of the plurality of base stations and a second traffic condition on the wireless backhaul line between each of the plurality of sub-base stations 20, and determines a combination of core base station 10 and at least a part of the plurality of sub-base stations 20 as an active base station. Thereby, wireless system 100 can accurately estimate the power consumption amount required at the time of operation of core base station 10 and each of sub-base stations 20 configuring wireless system 100, and thus, it is possible to support the provision of a stable wireless communication traffic while adaptively suppressing the power consumption amount.

Network management server 50 estimates a power consumption amount when each of the combinations of core base station 10 and at least a part of the plurality of sub-base stations 20 satisfying the first traffic condition and the second traffic condition is in an active state, and determines the active base station based on the estimation result of the power consumption amount and the power consumption amount criterion. Thereby, wireless system 100 can adaptively determine an active base station including core base station 10 and sub-base stations 20 satisfying a desirable predetermined power consumption amount criterion during an operation.

Network management server 50 transmits an active instruction to activate all the plurality of sub-base stations 20 in a predetermined period (for example, a collection period of traffic conditions of approximately 5 seconds) to each sub-base station 20. Thereby, network management server 50 can roughly grasp what degree of terminal connection desire exists in a communication area of which sub-base station 20 when wireless system 100 operates, and thus, it is possible to properly derive a distribution of the traffic which can be changed in time.

After a predetermined period (for example, a collection period of traffic conditions of approximately 5 seconds), network management server 50 transmits a sleep instruction to sub-base station 20 that is in the sleep state before a predetermined period starts. Thereby, since sub-base station 20 which is originally in the sleep state can return to the sleep state again, sub-base station 20 is limitedly in an active state only in the collection period of the traffic distribution, and thus, it is possible to reduce the total power consumption amount of wireless system 100.

Each of the plurality of base stations does not perform a data communication with one or more terminals accommodated in the communication area of the related station in a predetermined period (for example, a collection period of traffic conditions of approximately 5 seconds), and collects the traffic conditions according to the number of terminals requesting a data communication with the related station to be reported to network management server 50. Thereby, core base station 10 and each of all sub-base stations 20 do not perform transmission and reception of user data signals with the terminal accommodated in the communication area of the related station, and thus, it is not necessary to consume the amount of power relating to the transmission and reception, and it is possible to suppress an increase in power consumption amount of wireless system 100.

Network management server 50 includes sub-base station power on and off history database D1 holding estimation results of the power consumption amount of each of the plurality of sub-base stations 20 and a history of the active state or the sleep state in association with each other, and determines an active base station using the sub-base station power on and off history database. Thereby, for example, when the collected traffic condition is the same as or similar to the previous traffic condition, network management server 50 can use the previous history as it is or by changing a part thereof, and thus, it is possible to speed up determination of the active base station and to partially suppress an increase in the power consumption amount.

When core base station 10 and each of sub-base stations 20 do not need to transmit user data signals to be collected or collected to backbone network CNW, network management server 50 estimates power consumption amounts of core base station 10 and each of sub-base stations 20 as a power consumption amount criterion, based on the condition that the user data signals may be transmitted only into the sharing base station group. Thereby, when network management server 50 handles the user data signal having characteristics that the user data signal only needs to be shared with a base station group (for example, sub-base stations BS3, BS8, and BS9 in FIG. 1) registered in, for example, sub-base station group database D2, a range in which the user data signal is transmitted and received is limited to the base station group, and thus, the power consumption amount of wireless system 100 can be reduced compared to a case where the user data signal is transmitted to backbone network CNW via core base station 10.

Sub-base station 20 further includes user data processor 26 as an example of a data processor performing data processing (for example, video compression and data mining processing) of reducing a data size of the user data signal to the user data signal transmitted from the terminal. Sub-base station 20 transmits the user data signal having the data size after the data processing to network management server 50 via core base station 10. Thereby, network management server 50 can receive and acquire user data signal U' whose data processing is completed (in other words, the data size is reduced compared to original user data signal U) from each sub-base station 20, thereby, being able to preferentially determine a sub-base station handling the user data signal that can reduce the data size as the active base station, which can contribute to reduction of the power consumption amount of wireless system 100.

Although the embodiments are described above with reference to the accompanying drawings, the present disclosure is not limited to such examples. It is obvious that those skilled in the art can derive various modification examples, an alteration example, a replacement example, an addition example, a removal example, and an equivalent example within the scope of the claims, which is understood to be also within the technical scope of the present disclosure. Configuration elements of the above-described embodiments may be combined variously within a range without departing from the spirit of the disclosure.

The present disclosure is useful as a wireless system, a power efficiency control method, a server, and a base station which achieve both securement of a system capacity required in a wireless communication and suppression to a minimum power consumption amount of the wireless system depending on a time change of a traffic volume.

What is claimed is:

1. A wireless system comprising:
a plurality of base stations including a first base station connected to a backbone network and a plurality of second base stations connected to the first base station by wireless multi-hop; and
a server disposed in the backbone network and communicating with the first base station,
wherein the server collects traffic conditions of one or more terminals accommodated in communication areas of the plurality of base stations for a predetermined period, determines a combination of the first base station and at least a part of the plurality of second base stations that satisfy the traffic conditions and a predetermined power consumption amount criterion as an active base station, and determines path information for connecting the active base station by the wireless multi-hop to notify the active base station of the path information and transmits a sleep instruction for setting a sleep state in which a power consumption amount is capable of being reduced to base stations other than the active base station.

2. The wireless system of claim 1,
wherein the server repeatedly collects the traffic conditions and determines the active base station satisfying the traffic conditions and the power consumption amount criterion at each time of the collection.

3. The wireless system of claim 1,
wherein the server determines a combination of the first base station and at least a part of the plurality of second base stations, which satisfy a first traffic condition on an air interface line between each of the plurality of base stations and one or more terminals accommodated in a communication area of each related station and a second traffic condition on a wireless backhaul line between the plurality of second base stations, as the active base station.

4. The wireless system of claim 3,
wherein the server estimates a power consumption amount when each of the combinations of the first base station and at least a part of the plurality of second base stations which satisfy the first traffic condition and the second traffic condition enters an active state, and determines the active base station based on an estimation result of the power consumption amount and the power consumption amount criterion.

5. The wireless system of claim 1,
wherein the server transmits an active instruction to activate all the plurality of second base stations to the respective second base stations in the predetermined period.

6. The wireless system of claim 5,
wherein after the predetermined period, the server transmits the sleep instruction to the second base station which was in the sleep state before the predetermined period starts.

7. The wireless system of claim 1,
wherein each of the plurality of base stations does not perform data communication with one or more terminals accommodated in the communication area of the related station in the predetermined period, and collects traffic conditions according to the number of terminals requesting data communication with the related station to report the traffic conditions to the server.

8. The wireless system of claim 1,
wherein the server includes a history database holding an estimation result of power consumption amount of each of the plurality of second base stations and a history of an active state or the sleep state in association with each other, and determines the active base station by using the history database.

9. The wireless system of claim 4,
wherein when it is not necessary to transmit user data signals that are collected or have been collected by the first base station and each of the second base stations to the backbone network, the server estimates the power consumption amounts of the first base station and each of the second base stations as the power consumption amount criterion, based on a condition that the user data signal may be transmitted only into a sharing base station group.

10. A power efficiency control method performed by a wireless system including a plurality of base stations including a first base station connected to a backbone network and a plurality of second base stations connected to the first base station by wireless multi-hop, and a server disposed in the backbone network and communicating with the first base station, the power efficiency control method comprising:
collecting traffic conditions of one or more terminals accommodated in communication areas of the plurality of base stations for a predetermined period;
determining a combination of the first base station and at least a part of the plurality of second base stations that satisfy the traffic conditions and a predetermined power consumption amount criterion as an active base station; and
determining path information for connecting the active base station by the wireless multi-hop to notify the active base station of the path information and transmitting a sleep instruction for setting a sleep state in which a power consumption amount is capable of being reduced to base stations other than the active base station.

11. The power efficiency control method of claim 10,
wherein the traffic conditions are repeatedly collected, and the active base station satisfying the traffic conditions and the power consumption amount criterion is determined at each time of the collection.

12. The power efficiency control method of claim 10,
wherein the combination of the first base station and at least a part of the plurality of second base stations which satisfy a first traffic condition on an air interface line between each of the plurality of base stations and one or more terminals accommodated in a communication area of each related station and a second traffic condition on a wireless backhaul line between the plurality of second base stations is determined as the active base station.

13. The power efficiency control method of claim 12,
wherein a power consumption amount is estimated when each of the combinations of the first base station and at least a part of the plurality of second base stations which satisfy the first traffic condition and the second traffic condition enters an active state, and the active base station is determined based on an estimation result of the power consumption amount and the power consumption amount criterion.

14. The power efficiency control method of claim 10,
wherein an active instruction to activate all the plurality of second base stations is transmitted to the respective second base stations in the predetermined period.

15. The power efficiency control method of claim 14,
wherein after the predetermined period, the sleep instruction is transmitted to the second base station which was in the sleep state before the predetermined period starts.

16. The power efficiency control method of claim 10,
wherein data communication with one or more terminals accommodated in the communication area of the related station is not performed in the predetermined period, and traffic conditions according to the number of terminals requesting data communication with the related station is collected and reported to the server.

17. The power efficiency control method of claim 10,
wherein the active base station is determined by using a history database holding an estimation result of power consumption amount of each of the plurality of second base stations and a history of an active state or the sleep state in association with each other.

18. The power efficiency control method of claim 13,
wherein when it is not necessary to transmit user data signals that are collected or have been collected by the first base station and each of the second base stations to the backbone network, the power consumption amounts of the first base station and each of the second base stations are estimated as the power consumption amount criterion, based on a condition that the user data signal may be transmitted only into a sharing base station group.

19. A server disposed in a backbone network comprising:
a communicator communicating with a first base station connected to the backbone network;
a collector collecting traffic conditions of one or more terminals accommodated in a communication area of each of a plurality of base stations including the first base station and a plurality of second base stations connected to the first base station by wireless multi-hop in a predetermined period; and
a determiner determining a combination of the first base station and at least a part of the plurality of second base stations that satisfy the traffic conditions and a predetermined power consumption amount criterion as an active base station,
wherein the determiner determines path information for connecting the active base station by the wireless multi-hop to notify the active base station of the path information and transmits a sleep instruction for setting a sleep state in which a power consumption amount is capable of being reduced to base stations other than the active base station via the communicator.

20. A base station connected to a first base station connected to a backbone network by wireless multi-hop, comprising:
a communicator collecting traffic conditions of one or more terminals accommodated in a communication area of a related station for a predetermined period and transmitting the traffic conditions to the first base station communicating with a server disposed in the backbone network;
a controller controlling an active state or a sleep state of the related station based on a determination result of whether or not the base station is an active base station satisfying the traffic conditions and a predetermined power consumption amount criterion; and
a path manager setting a path of the wireless multi-hop, based on path information of wireless multi-hop transmitted from the server via the first base station, when it is determined that a related station is the active base station based on the determination result.

21. The base station of claim 20,
wherein the controller shifts an operation mode of the related station to the sleep state, based on a sleep instruction transmitted from the server via the first base station, when it is determined that the related station is not the active base station based on the determination result.

22. The base station of claim 20, further comprising:
a data processor performing, on a user data signal transmitted from the terminal, data processing of reducing a data size of the user data signal,
wherein the communicator transmits the user data signal having the data size after the data processing to the server via the first base station.

* * * * *